United States Patent
Vishnubotla et al.

(10) Patent No.: US 11,294,649 B1
(45) Date of Patent: Apr. 5, 2022

(54) TECHNIQUES FOR TRANSLATING BETWEEN HIGH LEVEL PROGRAMMING LANGUAGES

(71) Applicant: Amazon Technologies, Inc., Seattle, WA (US)

(72) Inventors: Surya Vara Prasad Vishnubotla, Bangalore (IN); Mansi Goel, Bengaluru (IN); Anoop Putheth Balakrishnan, Bangalore (IN); Nalin Nanda, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/148,085

(22) Filed: Jan. 13, 2021

(51) Int. Cl.
*G06F 9/45* (2006.01)
*G06F 8/40* (2018.01)

(52) U.S. Cl.
CPC .................... *G06F 8/40* (2013.01)

(58) Field of Classification Search
CPC ... G06F 8/40; G06F 8/41; G06F 8/423; G06F 8/44; G06F 8/447
USPC ......................................................... 717/136
See application file for complete search history.

(56) References Cited

U.S. PATENT DOCUMENTS

| 5,842,204 | A * | 11/1998 | Andrews | G06F 8/423 |
| 10,782,943 | B1 * | 9/2020 | Wang | G06F 8/437 |
| 2004/0154007 | A1 * | 8/2004 | Koizumi | G06F 11/3624 717/151 |
| 2005/0005266 | A1 * | 1/2005 | Datig | G06N 5/02 717/136 |
| 2005/0216897 | A1 * | 9/2005 | Amrhein | G06F 11/3624 717/136 |
| 2005/0273772 | A1 * | 12/2005 | Matsakis | G06F 8/41 717/136 |
| 2006/0080647 | A1 * | 4/2006 | Bhansali | G06F 8/44 717/148 |
| 2006/0174230 | A1 * | 8/2006 | Drayton | G06F 8/52 717/136 |
| 2008/0022264 | A1 * | 1/2008 | Macklem | G06F 8/34 717/136 |

(Continued)

OTHER PUBLICATIONS

A system to generate test data and symbolically execute programs; author: L A Clarke published in 1976.*

(Continued)

*Primary Examiner* — Chameli Das
(74) *Attorney, Agent, or Firm* — Kilpatrick Townsend & Stockton LLP

(57) ABSTRACT

Systems and methods are described herein for translating code segments from one high-level programming language to another. The system may maintain any suitable number of decoding computing modules each configured to translate code of a corresponding language to an intermediate configuration object that represents an abstracted version of the code that identifies the operations performed on one or more variables and the order by which these operations are performed in the code. The intermediate configuration object can be used to generate new code segments expressed in different programming languages. In some embodiments, generating the a new code segment in a given programming language from the intermediate configuration object can be performed by an encoding computing module that is specific to that language.

19 Claims, 14 Drawing Sheets

(56) References Cited

U.S. PATENT DOCUMENTS

| | | | | |
|---|---|---|---|---|
| 2009/0222799 A1* | 9/2009 | Stewart | .................. | G06F 8/427 |
| | | | | 717/143 |
| 2009/0271771 A1* | 10/2009 | Fallows | .............. | G06F 9/45516 |
| | | | | 717/137 |
| 2010/0199257 A1* | 8/2010 | Biggerstaff | ............. | G06F 8/456 |
| | | | | 717/104 |
| 2013/0247017 A1* | 9/2013 | Bernecker | ................ | G06F 8/51 |
| | | | | 717/148 |
| 2013/0283250 A1* | 10/2013 | Eichenberger | ............ | G06F 8/43 |
| | | | | 717/144 |
| 2018/0357145 A1* | 12/2018 | Sarangapani | ........... | G06F 8/437 |

OTHER PUBLICATIONS

The architecture of virtual machines, author: S Muchnick, published on 1997.*

Title: Improving Programming Language Transformation; author: S O'Hara, published on 2018.*

Title: The execution algorithm of Mercury, an efficient purely declarative logic programming language author: Z Somogyi, published on 1996.*

Title: Source code files as structured documents author: JI Maletic, published on 2002.*

\* cited by examiner

```
302 →  <%comments>
       Description: Formats a wattage attribute of an item to be displayed at a detail page.
304 →  </%comment>

306 →  <%shared_vars>
           $stringList
308 →  </%shared_vars>
310 →  <%method PREPARE>
  314 →    <%args>
               $item
  316 →    </%args>
  318 →    <%init>
               $stringList = $Strings->getString({ name => 'text-tech-spec-wattage_37059' }, );
               $item->prefetch(['getLightingAttributes',]);
  320 →    </%init>
312 →  </%method>

322 →  <%args>
           $item
           $productDetailsRedesign => undef
324 →  </%args>

326 →  <%init>                                                                  ┌─ 334
       ┌────────────────────────────────────────────────────────────────────────┐
       │ my $lightingAttributes = $item->getLightingAttributes();                │
       │ my $wattage = $lightingAttributes ? $lightingAttributes->find( name => 'wattage')  ← 332
       │ return unless $wattage;                                                 │
       │                                                                        │
       │ my $values = $wattage->getValueList();                                  │
       │ return unless $values;                                                  │
       │                                                                        │
       │ $wattage = ($values->[0])->getDisplayableValue();                       │
       │ return unless $wattage;                                                 │
       │                                                                        │
       │ my $wattageLabel = $stringList->find(name => 'text-tech-spec-wattage_37059'); │
       │ $wattageLabel = ($wattageLabel && $wattageLabel->isOK) ? $wattageLabel->getValue() │
       │ $wattageLabel = $productDetailsRedesign ? $wattageLabel : $wattageLabel . ': '; │
       │ my $wattageStr = $ICU->formatNumber('#,###.#', $wattage);               │
       └────────────────────────────────────────────────────────────────────────┘
328 →  </%init>

┌ % if ( $productDetailsRedesign ) {
       │ <tr class="wattage"><td class="label"><% $wattageLabel %></td><td class="value"><% $wa
330 ─┤ % } else {
       │ <li><b><% $wattageLabel %></b> <% $wattageStr %></li>
       │ % }
       └
```

300          FIG. 3

```
PPI::Document ← 402
   PPI::Statement
420 ...
   PPI::Statement::Variable
      PPI::Token::Word 'my'
      PPI::Token::Symbol '$wattage'
      PPI::Token::Operator '='
      PPI::Token::Symbol '$lightingAttributes'
      PPI::Token::Operator '?'
      PPI::Token::Symbol '$lightingAttributes'
      PPI::Token::Operator '->'
404
      PPI::Token::Word 'find'
      PPI::Structure::List ( ... )
         PPI::Statement::Expression
            PPI::Token::Word 'name'
            PPI::Token::Operator '=>'
            PPI::Token::Quote::Single "wattage"
      PPI::Token::Operator ':'
      PPI::Token::Word 'undef'
   PPI::Statement::Break
      PPI::Token::Word 'return'
414
      PPI::Token::Word 'unless'
      PPI::Token::Symbol '$wattage'
   PPI::Statement::Variable
      PPI::Token::Word 'my'
      PPI::Token::Symbol '$values'
      PPI::Token::Operator '='
406
      PPI::Token::Symbol '$wattage'
      PPI::Token::Operator '->'
      PPI::Token::Word 'getValueList'
      PPI::Structure::List ( ... )
   PPI::Statement::Break
416 ...
   PPI::Statement
      PPI::Token::Symbol '$wattage'
      PPI::Token::Operator '='
      PPI::Structure::List ( ... )
         PPI::Statement::Expression
            PPI::Token::Symbol '$values'
            PPI::Token::Operator '->'
408
            PPI::Structure::Subscript [ ... ]
               PPI::Statement::Expression
                  PPI::Token::Number '0'
      PPI::Token::Operator '->'
      PPI::Token::Word 'getDisplayableValue'
      PPI::Structure::List ( ... )

PPI::Statement::Break
418 ...
PPI::Statement::Variable
   PPI::Token::Word 'my'
   PPI::Token::Symbol '$wattageLabel'
   PPI::Token::Operator '='
   PPI::Token::Symbol '$stringList'
   PPI::Token::Operator '->'
   PPI::Token::Word 'find'
   PPI::Structure::List ( ... )
410
      PPI::Statement::Expression
         PPI::Token::Word 'name'
         PPI::Token::Operator '=>'
         PPI::Token::Quote::Single "text-tech-spec-wattage_37059"
PPI::Statement
   PPI::Token::Symbol '$wattageLabel'
   PPI::Token::Operator '='
   PPI::Structure::List ( ... )
      PPI::Statement::Expression
         PPI::Token::Symbol '$wattageLabel'
         PPI::Token::Operator '&&'
         PPI::Token::Symbol '$wattageLabel'
         PPI::Token::Operator '->'
422
         PPI::Token::Word 'isOK'
      PPI::Token::Operator '?'
      PPI::Token::Symbol '$wattageLabel'
      PPI::Token::Operator '->'
      PPI::Token::Word 'getValue'
      PPI::Structure::List ( ... )
      PPI::Token::Operator ':'
      PPI::Token::Quote::Single "Wattage"
PPI::Statement::Variable
   PI::Token::Word 'my'
   PPI::Token::Symbol '$wattageStr'
   PPI::Token::Operator '='
   PPI::Token::Symbol '$ICU'
   PPI::Token::Operator '->'
   PPI::Token::Word 'formatNumber'
412
   PPI::Structure::List ( ... )
      PPI::Statement::Expression
         PPI::Token::Quote::Single "#,###.#"
         PPI::Token::Operator ','
         PPI::Token::Symbol '$wattage'

```
PPI::Document null
    PPI::Statement null
        PPI::Token::Symbol $wattage
        PPI::Token::Operator =
        PPI::Statement::Expression null
            PPI::Token::Symbol $lightingAttributes
502         PPI::Token::Operator ->
            PPI::Structure::Function find
                PPI::Function::Argument null
                    PPI::Token::Word name
                    PPI::Token::Operator =>
                    PPI::Token::Quote::Single 'wattage'
    PPI::Statement::Variable null
        PPI::Token::Word my
        PPI::Token::Symbol $values
504     PPI::Token::Operator =
        PPI::Statement::Expression null
            PPI::Token::Symbol $wattage
            PPI::Token::Operator ->
            PPI::Structure::Function getValueList
    PPI::Statement null
        PPI::Token::Symbol $wattage
        PPI::Token::Operator =
        PPI::Statement::Expression null
            PPI::Statement::Expression null
                PPI::Token::Symbol $values
506             PPI::Token::Operator ->
                PPI::Structure::Subscript [ ... ]
                    PPI::Statement::Expression null
                        PPI::Token::Number 0
            PPI::Token::Operator ->
            PPI::Structure::Function getDisplayableValue
    PPI::Statement null
        PPI::Token::Symbol $wattageLabel
        PPI::Token::Operator =
        PPI::Statement::Expression null
            PPI::Token::Symbol $stringList
508         PPI::Token::Operator ->
            PPI::Structure::Function find
                PPI::Function::Argument null
                    PPI::Token::Word name
                    PPI::Token::Operator =>
                    PPI::Token::Quote::Single 'text-tech-spec-wattage_37059'
    PPI::Statement::Variable null
        PPI::Token::Word my
        PPI::Token::Symbol $wattageStr
        PPI::Token::Operator =
        PPI::Statement::Expression null
            PPI::Token::Symbol $ICU
510         PPI::Token::Operator ->
            PPI::Structure::Function formatNumber
                PPI::Function::Argument null
                    PPI::Token::Quote::Single '#,###.#'
                PPI::Function::Argument null
                    PPI::Token::Symbol $wattage
```

FIG. 5

```
RootNode()
FunctionNode(
    functionName=find,
    objectName=Pin.Version(num=1, isConstant=false, parent=Node(name=lightingAttributes, next=null))
    args=[Pin.Version(num=1, isConstant=true, parent=Node(name='wattage', next=null))
    output=Pin.Version(num=1, isConstant=false, parent=Node(name=wattage, next=null))
)                                                                                                          ⎬ 702
FunctionNode(
    functionName=getValueList,
    objectName=Pin.Version(num=1, isConstant=false, parent=Node(name=wattage, next=null))
    args=[],
    output=Pin.Version(num=1, isConstant=false, parent=Node(name=values, next=null))
)                                                                                                          ⎬ 704
FunctionNode(
    functionName=getDisplayableValue,
    objectName= ArrowOperatorNode(
        super=Node(name=ARROW, next=[])
        "arity":"2",
        "args":[
                Pin.Version(num=1, isConstant=false, parent=Node(name=values, next=null))
                Pin.Version(num=1, isConstant=true, parent=Node(name=0, next=null))
        ]
    ),
    args=[],
    output=Pin.Version(num=2, isConstant=false, parent=Node(name=wattage, next=null))
)                                                                                                          ⎬ 706
FunctionNode(
    functionName=find,
    objectName=Pin.Version(num=1, isConstant=false, parent=Node(name=stringList, next=null))
    args=[Pin.Version(num=1, isConstant=true, parent=Node(name='text-tech-spec-wattage_37059',
next=null))]
    output=Pin.Version(num=1, isConstant=false, parent=Node(name=wattageLabel, next=null))
)                                                                                                          ⎬ 708
FunctionNode(
    functionName=formatNumber,
    objectName=Pin.Version(num=1, isConstant=false, parent=Node(name=ICU, next=null))
    args=[
        Pin.Version(num=1, isConstant=true, parent=Node(name='#,###.#', next=null))
        Pin.Version(num=2, isConstant=false, parent=Node(name=wattage, next=null))
    ],
    output=Pin.Version(num=1, isConstant=false, parent=Node(name=wattageStr, next=null))
)                                                                                                          ⎬ 710
```

```
(define
  (
    productApi::feature::productDetails::attribute::wattage
    string::obfuscatedMarketplaceId
    string::asin
    struct::response
  )
  (and
    (= attribute "wattage")
    (productApi::feature::productOverview::util::getAttributeDisplayData obfuscatedMarketplaceId   ← 902
      (. attributeData "catalogData" values)
    (productApi::feature::productDetails::util::getValueFromCatalogResponse obfuscatedMarketplaceId   ← 904
    (productApi::feature::productOverview::util::formAttributeStruct obfuscatedMarketplaceId   ← 906
  )
```

```
{
  dp_product_overview_pinfo_attribute_catalog_keys:["wattage"
  ],
  dp_product_overview_pinfo_attribute_display_string_id:"text-tech-spec-wattage_37059",
  dp_product_overview_pinfo_attribute_default_display_string:"Wattage",
  dp_product_overview_pinfo_attribute_key:"wattage",
  dp_product_overview_pinfo_attribute_link:{
  },
  dp_product_overview_pinfo_attribute_symbol:"DEFAULT_WATTAGE",
  table_name:dppinfo_product_overview_attributes,
  stage_version:"dp-product-overview-33"
}
```

```
{
    symbol:"DEFAULT_WATTAGE",
    labelData:{
        language_tag:pt_BR,
        value:"PotÎncia"
    },
    helpLink:{
    },
    catalogData:[
        {
            unit:watts,
            value:250.0,
            displayable_values:{
                unit:{
                    value:"Watts",
                    language_tag:pt_BR
                }
            }
        }
    ],
    extractKey:"",
    labelString:"PotÎncia",
    defaultLabel:"Wattage",
    label:"text-tech-spec-wattage_37059"
}
```

US 11,294,649 B1

TECHNIQUES FOR TRANSLATING BETWEEN HIGH LEVEL PROGRAMMING LANGUAGES

BACKGROUND

Software written in a high-level programming language (e.g., Perl®, Python®, C++, etc.) includes many coding components. If the code is needed in a different high-level programming language, the translation between the two is often manually performed. The process of translation from one language to another can be exceedingly tedious, time-consuming, error prone, and is not scalable. Embodiments of the invention address these and other problems, individually and collectively.

BRIEF DESCRIPTION OF THE DRAWINGS

Various embodiments in accordance with the present disclosure will be described with reference to the drawings, in which:

FIG. 3 is an example code sample including a number of code segments, in accordance with at least one embodiment;

FIG. 4 is an example document tree corresponding to the code segment of FIG. 3, in accordance with at least one embodiment;

FIG. 5 is an example optimized document tree corresponding to the code segment of FIG. 3 and the document tree of FIG. 4, in accordance with at least one embodiment;

FIG. 7 is a programmatic representation of the intermediate configuration object of FIG. 5, in accordance with at least one embodiment;

FIG. 9 is an example code segment generated from the intermediate configuration object of FIGS. 2 and 8, in accordance with at least one embodiment;

FIG. 10 is an example metadata object generated from the intermediate configuration object of FIGS. 2 and 8, in accordance with at least one embodiment.

DETAILED DESCRIPTION

Figure 1:
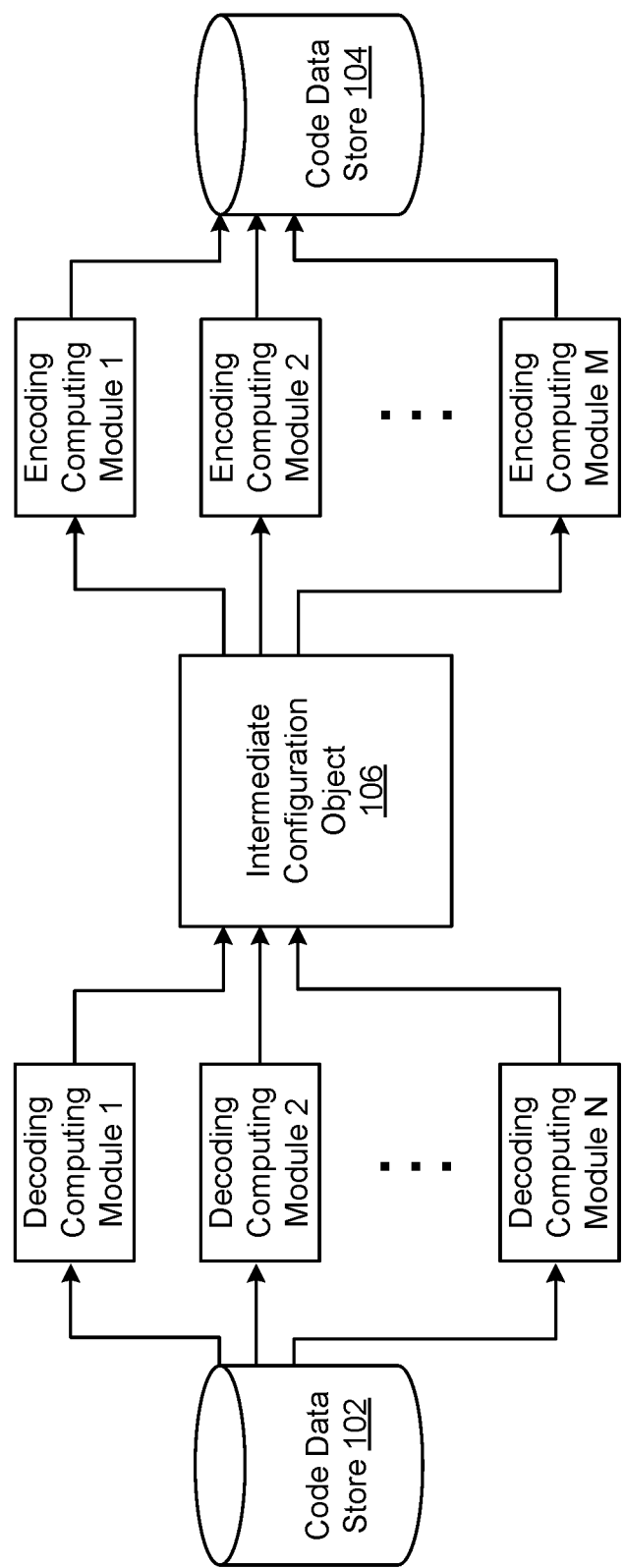
FIG. 1 is an example environment in which code segments may be translated from one programming language to another, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to translating code segments from one high-level programming language to another. As used herein, a "high-level programming language" refers to a programming language that strongly abstracts from the details of the computer, allows the use of symbolic operators to signify operations and symbolic names to represent data and/or data structures, but that are also structured with syntax and semantics to describe the computing algorithm. Example high-level programming languages include Perl®, C++, C, Mason®, Python®, Java®, Visual Basic®, Ruby®, PHP, C#, and the like. A "code segment," as used herein, may include any suitable number of variables that hold data (referred to as "pins"), basic constructs (e.g., referred to as "operators") such as conditional checks (e.g., and, or, not, >, <, =, >=, <=), built-in operators (e.g., +, /, *), branching operations (e.g., if/else, switch-case, ternary operator, return, etc.), and loops (e.g., for, while, do-while, for each, etc.), and logic that transforms data (e.g., methods/functions that convert input to output using operations).

In some embodiments, a decoding computing module can be utilized to translate a code segment from one high-level programming language to a programming agnostic format referred to as an "intermediate configuration object." An intermediate configuration object, in some cases, can be a directed acyclic graph with nodes and edges, where the nodes individually represent a variable or operations of the code segment, and the edges are directed from one node to another, such that there is no way, starting from one node, to follow a directed sequence of edges to eventually loop back to that node again. The intermediate configuration object can represent the order of variables and operations within the code segment. An encoding computing module may then be utilized to translate the nodes of the intermediate configuration object to generate the code segment as written in a different high-level programming language. This process may be performed any suitable number of times to translate various code segments to a different programming language in a manner that does not require manual translation.

The techniques disclosed herein can be utilized in a number of contexts. By way of example, the techniques may be utilize to automatically generate code in a high-level programming language via a user interface, potentially enabling non-technical stake holders (e.g., a project manager) to manage business logic. As another non-limiting example, the techniques disclosed herein may be utilized by taking business logic written in one programming language and publishing it in various other programming languages for systems in those respective languages to consume. For example, consider a library function (e.g., a function to generate SHA-256 hash for a given string) is written in Java. The business logic within this code could be translated into various programming languages such that systems in respective languages may consume it. In some embodiments, an application programming interface written in one language can be utilized to generate application programming interfaces in a number of other programming languages. This can enable functionality written in a given language to be invocable by other programming languages such that data received through a respective application programming interface may cause underlying code in the given language to be executed. In this manner, the functionality, although itself unchanged, can be exposed through a variety of application programming interfaces. Additionally, although not depicted, it should be appreciated that a visual debugging framework can be utilized to depict the data flow of business logic through visual representation of the pins (e.g., variables) and operators corresponding to the intermediate configuration objects discussed herein. Thus, any of the data provided in FIGS. 3-7 and/or 9-11 may be presented via one or more graphical user interfaces.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example environment 100 in which code segments may be translated from one programming language to another, in accordance with at least one embodiment. Environment 100 may include data stores for maintaining one or more code segments (e.g., code data stores 102 and 104). In some embodiments, code data stores 102 and 104 may be the same container, while in other embodiments, code data stores 102 and 104 may be separate containers. In some embodiments, code data store 102 may include any suitable instances of code written in one or more high-level programming languages (e.g., Mason, C++, C#, Python, Java, etc.). In some embodiments, these instances of code may include any suitable number of tags that identify specific portion of the code as a code segment for which one or more translations may be applied.

The environment may include any suitable number of decoding computing modules (e.g., decoding computing modules 1-N). In some embodiments, each decoding computing module corresponds to functionality for translating code segments of a particular programming language to an intermediate configuration object 106. As discussed above, intermediate configuration object 106 may be a directed acyclic graph of any suitable size. The nodes of intermediate configuration object 106 may correspond to a variable, value, or operation of a code segment. The number of decoding computing modules may vary. Each may be configured with translation rules that are specific to a given high-level programming level. Thus, decoding computing module 1 may be configured to translate code provided as input from Perl to intermediate configuration object 106 while decoding computing module 2 may be configured to translate code provided as input to C#. Each code segment in code data store 102 may be translated utilizing a decoding computing module to generate intermediate configuration object 106. Although a single intermediate configuration object is depicted in FIG. 1, it should be understood that any suitable number of intermediate configuration object may be generated and/or stored. An example of one decoding computing module will be discussed in further detail in connection with FIG. 2.

The environment may include any suitable number of encoding computing modules (e.g., encoding computing modules 1-M). In some embodiments, each encoding computing module corresponds to functionality for translating the intermediate configuration object 106 to a high-level programming language. Each node of the intermediate configuration object 106 may be processed in a recursive fashion utilizing one of the encoding computing modules. Each encoding computing module may be configured to be specific to a particular high-level programming language. It should be appreciated that the combination of high-level programming languages represented by the decoding computing modules 1-N is not necessarily the same combination of the high-level programming languages represented by the encoding computing modules 1-N, although they could be. Encoding computing module 1 may be configured to translate an intermediate configuration object (e.g., intermediate configuration object 106) provided as input to a code segment written in a particular high-level programming language (e.g., Datapath). Each translated code segment may be stored in code data store 104 for subsequent use. An example of one encoding computing module will be discussed in further detail in connection with FIG. 6.

Figure 2:
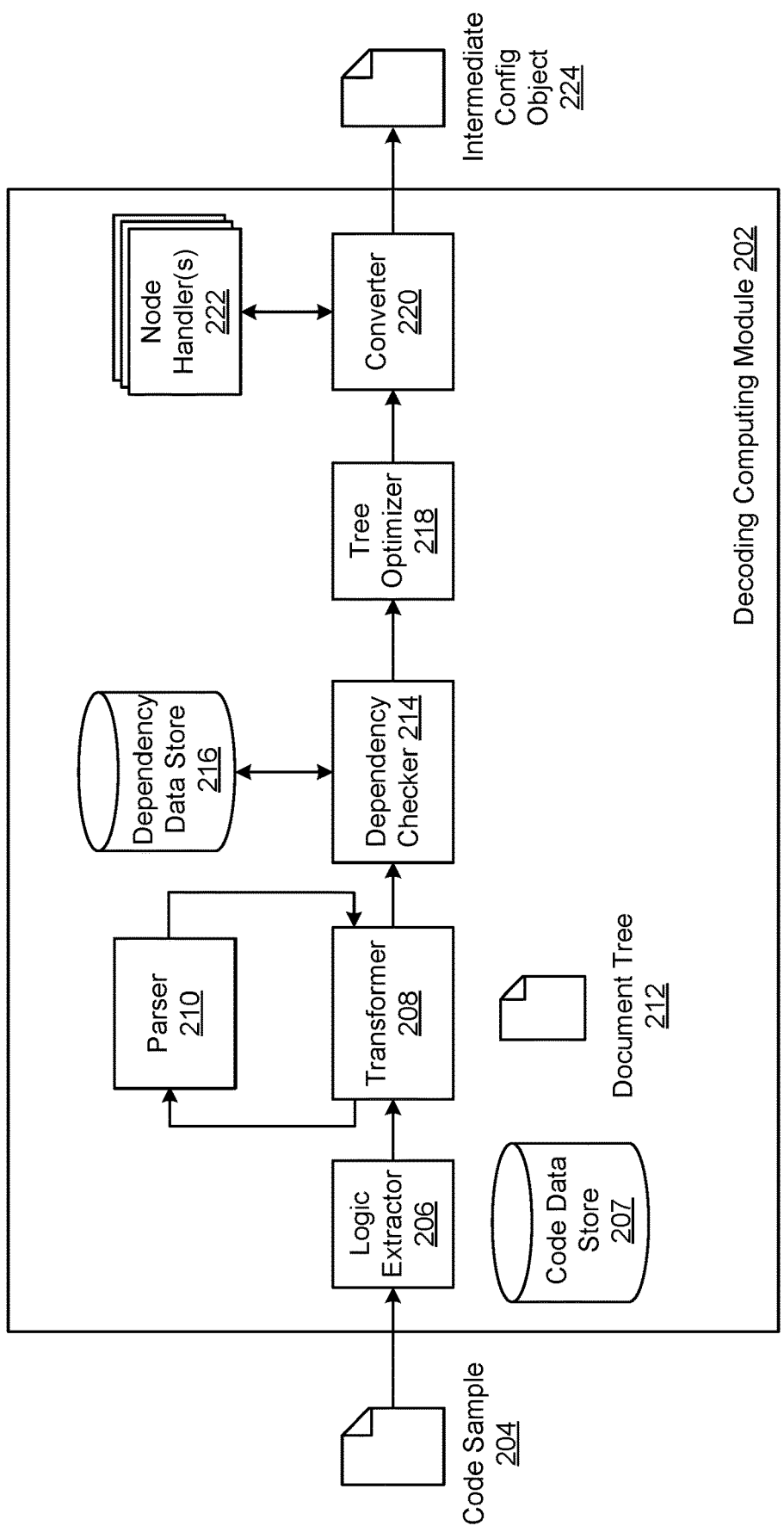
FIG. 2 is a flow illustrating example computing components of a decoding computing module that executes a decoding process to transform a code segment to an intermediate node configuration, in accordance with at least one embodiment.

FIG. 2 is a flow illustrating example computing components of a decoding computing module 202 (e.g., an example of decoding computing module 1 of FIG. 1) that executes a decoding process to transform a code segment to an intermediate node configuration, in accordance with at least one embodiment.

Code sample 204 may include programming code in any suitable high-level programming language (e.g., Perl). In some embodiments, the code sample 204 may be identified as being written in a particular programming language or the decoding computing module 202 (or another computing module) may be configured to identify a code segment as being written in the programming language specific to the decoding computing module 202. As a non-limiting example, a language identifier (not depicted) may analyze the content of code sample 204 to identify one or more indications of the programming language in which code sample 204 is written. The language identifier may be configured to identify code samples corresponding to any suitable number of programming language. Once identified the language identifier may pass the code sample 204 as input to a corresponding decoding computing module. By way of example, code sample 204 may be identified as being written in Perl (e.g., based at least in part on a set of predefined rules for analyzing the syntax and/or grammar of the code sample 204) and it may be provided to the decoding computing module 202 (e.g., a module specific to the Perl language) as input.

In some embodiments, code sample 204 may include code as well as various tags identifying particular aspects of code segments encapsulated by the tags. By way of example, the tags may be any suitable predefined alphanumeric pattern (e.g., "% init", "% doc", % method", "//logic", etc.) that identifies a beginning and end of a code segment. Upon receipt of the code sample 204 by the decoding computing module 202, code sample 204 may be provided as input to logic extractor 206. Logic extractor 206 may be configured to execute any suitable operations to identify code segments. By way of example, the logic extractor 206 may be configured to parse the code sample 204 to identify code encapsulated between two tags that are predefined as indicating a beginning and ending of a code segment (e.g., "% init" and "%/init", <code> and </code>, etc.). In some embodiments, code that is not encapsulated between two such tags is discarded and the remaining code is saved (e.g., in code data store 102. In other embodiments, code that is encapsulated within two such tags is extracted and stored in code data store 207 (an example of the code data store 102 of FIG. 1). These tags may be used to identify logic which translation is to be performed. In some embodiments, a predefined set of tags including one or more pairs of tags (e.g., (<% init>, </% init>), (<% args>, </% args>), (<% shared vars>, </% shared vars>), (<% method>, </% method>), etc.) may be utilized to identify any suitable number of code segments. Code that is encapsulated between tags that are not included in this predefined set, and/or code that is not encapsulated at all, may be removed and/or ignored by the logic extractor 206. In some embodiments, logic extractor 206 may access a predefined set of benign tags that identify code for which a translation is not to be performed. If so, the logic extractor 206 may be configured to ignored code which is encapsulated by this predefined set of benign tags.

FIG. 3 is an example code sample including a number of coding segments, in accordance with at least one embodiment. The code sample 300 of FIG. 3, include various variables, operations, statements, and tags. By way of example, tags 302 and 304 define a beginning and ending, respectively, of a code segment (e.g., a code segment including a comment). Likewise, each pair of tags 306/308, 310/312, 314/316, 318/320, 322/324, and 326/328 define the beginning/ending of a corresponding code segment. The specific number of predefined tags may vary depending on the environment and context in which the code is executed. In some embodiments, code may not be encapsulated by any tag such as the code segment 330. In some embodiments, a predefined list of tags (e.g., (<% init>, </% init>), (<% args>, </% args>), (<% shared vars>, </% shared vars>), (<% method>, </% method>), etc.) may be utilized to identify any suitable number of code segments from code sample 300. Code that is encapsulated by other tags (e.g., (<% comments>, </% comments), etc.) or that is not encapsulated by any tags (e.g., code segment 330) may be ignored and/or removed. In some embodiments, a set of tags (e.g., (<% comments>, </% comments)) may be defined that specifically identifies code segments which are to be ignored.

Returning now to FIG. 2. As a non-limiting example, logic extractor may be configured to extract the code segment between <% init> and </% init> of FIG. 3 (e.g., tag 326 and 328, respectively). Using these tags, code segment 334 may be identified by the logic extractor 206 as a code segment that is to be translated based at least in part on identifying that the code segment 334 is encapsulated by tags <% init> and </% init>, which may be two in a set of predefined tags with which code segments are to be identified. It should be appreciated that, in some embodiments, logic extractor 206 may operate as a module separate from the decoding computing module, and thus, the code segment 334 may be identified by the logic extractor 206 and provided as input to the decoding computing module 202.

Once a code segment (e.g., code segment 334) is identified, it may be transmitted to the transformer 208. Transformer 208 may be configured to transform the code segment to an in-memory document tree. The specific process for transforming the code segment to an in-memory document tree may be specific to the language corresponding to the decoder computing module 202. By way of example, transformer 208 may utilize parser 210 to generate document tree 212. As a non-limiting example, consider that decoding computing module 202 is specific to the Perl programming language. In this context, parser 210 may be configured to receive as input one or more code segments (e.g., the code segment(s)) and execute operations to parse the code segment as a string to generate the document tree 212. In some embodiments, the transformer 208 may pass the code segment(s) to the parser 210, which may be configured to execute a Perl parser (e.g., PPI::Document from the open source standard PPI, Parse::Perl::Isolated) which takes a string as input (e.g., the code segment(s) as a string) and generates a document tree. Although a Perl parser is used for illustration, it should be appreciated that the parser 210 may perform other language specific operations depending on the language to which decoding computing module corresponds. As another non-limiting example, parser 210 could be a Domain Object Model (DOM) parser in Java that is configured to read Java code as a string to generate document tree 212 according to a set of rules specific to Java. Although examples herein may utilize functionality from the open source standard PPI for illustrating, it should be appreciated that any suitable parser may be utilized and thus the data of FIGS. 4 and 5 may be differently formatted and/or indicated depending on the particular parser utilized to parse code segment 334.

FIG. 4 is an example document tree 400 corresponding to the code segment 334 of FIG. 3, in accordance with at least one embodiment. The document tree 400 (e.g., an example of the document tree 212 of FIG. 2) defines an ordering of each variable, statement, and operator of the code sample 300 of FIG. 3. On the top of the document tree is PPI::Document object 402 which represents the code sample 300. Any code segment provided to the parser 210 will begin similarly. Under PPI::Document may be any suitable number of statements, structures, and/or tokens. For the purposes of illustration, some of the content of document tree 400 is hidden (as indicated by " . . . "). A PPI::Structure may be any suitable series of tokens contained within matching braces which can include conditions, function arguments braces, code blocks, array and/or hash constructors, lists, and the like. PPI::Document may include any suitable number of PPI::Statements (e.g., PPI::Statement 404). Each PPI::Statement may include a series of token(s) and/or structure(s) that are generated from a single contiguous statement of Perl. By way of example, PPI::Statement 404, including the tokens, structures, and statements at 406 may represent the line of code at 332 of FIG. 3. In some embodiments, parser 210 may be configured to discard particular portions of code (e.g., comments, whitespaces, ";", etc.) while parsing. The document tree 212 may be output using a function call (e.g., a call to PPI::Dumper).

Returning to FIG. 2, the document tree 212 may be passed to dependency checker 214. Dependency checker 214 may be configured to pull, from the dependency data store 216, a set of dependencies specific to, in this rolling example, Perl. The set of dependencies obtained from the dependency data store 216 may be specific to the programming language to which decoding computing module 202 corresponds. In some embodiments, if the language in which the code segment will eventually be encoded is known (e.g., it is known that one is translating from Perl to Datapath), the set of dependencies may be specific to both the decoding programming language (Perl) and the encoding programming language (Datapath). The set of dependencies may be any suitable number of conditions that, if not met, would cause the decoding process to fail. Ensuring that the set of dependencies are satisfied may save computing resources as the decoding computing module may be kept from needlessly processing the code segment further. If the set of dependencies corresponding to the programming language to which decoding computing module 202 corresponds is satisfied, the document tree 212 may be passed to tree optimizer 218.

Tree optimizer 218 may be configured to execute any suitable number of code optimization operations. By way of an example, tree optimizer 218 may execute operations for simplifying complex operators into more basic operations. For example, increment operators (e.g., i++) may be converted by the tree optimizer 218 into two basic operations using addition and assignment operators (e.g., i=i+1). Similarly, decrement operators (e.g., i--) may be converted by the tree optimizer 218 to two basic operations using subtraction and assignment operators (e.g., i=i-1). Shorthand operators (as in i+=1, i-=1) may be converted to their respective mathematical and assignment operator (as in i=i+1, i=i-1). Ternary operators may be simplified to their corresponding if-else conditions. For example, the expression a=b>0 ? c:d may be simplified to:

```
if (b>0) {
    a=c;
}
else {
    a=d;
}
```

In some embodiments, the tree optimizer 218 may be configured to simplify reverse conditions into standard if conditional blocks. For example, the expression a=b if c>0 may be simplified into: if (c>0) {a=b;}. Similarly, the expression a=b unless c>0; may be simplified into: if (!(c>0)) {a=b;}.

In some embodiments, the tree optimizer 218 may be configured to break down any compound operations expressed in the document tree into granular operations. Said another way, the tree optimizer 218 may ensure that only one granular operation is set per tree level. This means that for at each level of the document tree 212, there should be only one child operator node. At each level of the document tree 212, there should be only one 'effective' operator. If multiple operators are at one level, the tree optimizer 218 may be configured to form a sub-tree of operations under the current level based on a predefined precedence of operations and their association. As a non-limiting example, the following PPI statements:

```
PPI::Document
    PPI::Statement::Variable
        PPI::Token::Symbol '$a'
        PPI::Token::Operator '='
        PPI::Token::Symbol '$b'
        PPI::Token::Operator '+'
        PPI::Token::Symbol '$c'
``` may be modified to the following to ensure that only one granular operations is set per PPI tree level:

```
PPI::Document
    PPI::Statement::Variable
        PPI::Token::Symbol '$a'
        PPI::Token::Operator '='
        PPI::Statement::Expression
            PPI::Token::Symbol '$b'
            PPI::Token::Operator '+'
            PPI::Token::Symbol '$c'
```

Thus, while the first example included operators '=' and '+' at the same level, the second example ensures that the '=' operator is on one level, while the '+' is on another level. The simplification may be done by first looking at operator precedence and associativity as defined for Perl. Operator precedence and associativity may be used to determine the arguments for the operator. When a complex operations (where output of one operation is input to another operation) is identified at a particular level in the PPI tree, the operation (e.g., "$b+$c") that provides input to the other operation is converted in an PPI::Statement::Expression node with the operation ("$b+$c") as one of its children node. In this manner, the tree optimizer 218 ensures that multiple operations per level are pre-processed into multiple levels with one operation at each level.

In some embodiments, the tree optimizer 218 may be configured to check for stale conditions that are known to always return true or false. If a stale condition is identified, the tree optimizer 218 may be configured to replace the conditional block to the corresponding logical set of operations that need to be performed if the conditions is stale (e.g., always true or always false). As a non-limiting example, the following conditional code may be replaced (since the condition is always true) with the expression a=a+1:

```
if (condition) {//where condition is set to always true
    a=a+1;
} else {
    a=a+2;
}.
```

In some embodiments, the tree optimizer 218 may be configured to identify function calls as well as the input arguments of the function. Thus, the following code:

```
PPI::Document
    PPI::Statement::Variable
        PPI::Token::Word 'my'
        PPI::Token::Symbol '$wattage'
        PPI::Token::Operator '='
        PPI::Token::Symbol '$lightingAttributes'
        PPI::Token::Operator '->'
        PPI::Token::Word 'find'
        PPI::Structure::List (...)
            PPI:: Statement: :Expression
                PPI::Token::Word 'name'
                PPI::Token::Operator '=>'
                PPI::Token::Quote::Single 'wattage'
``` may be modified to the following to ensure that only one granular operations is set per PPI tree level:

```
PPI::Document
    PPI::Statement::Variable
        PPI::Token::Symbol '$wattage'
        PPI::Token::Operator '='
        PPI::Statement::Expression
            PPI::Token::Symbol '$lightingAttributes'
            PPI::Token::Operator '->'
            PPI::Structure::Function 'find'
                PPI::Function::Argument
                    PPI::Token::Word 'name'
                    PPI::Token::Operator '=>
                    PPI::Token::Quote::Single 'wattage'
```

In some embodiments, the tree optimizer 218 may be configured to remove empty return statement, null objects, and the like. In some embodiments, tree optimizer 218 may be configured to combine a particular combination of statements into one statement.

FIG. 5 is an example optimized document tree 500 corresponding to the code segment 334 of FIG. 3 and the document tree 400 of FIG. 4, in accordance with at least one embodiment. Statement 502 is intended to correspond to statement 404 of FIG. 4. Variable 504 is intended to correspond to variable 406 of FIG. 4. Statement 506 is intended to correspond to statement 408 of FIG. 4. Variable 508 is intended to correspond to variable 410 of FIG. 4. Variable 510 is intended to correspond to variable 412 of FIG. 4. As depicted in FIG. 5, breaks 414, 416, and 418 have been removed. In some embodiments (e.g., when the encoding programming language is known), statements 420 and 422 may be removed as they may have no corresponding feature in the encoding programming language to be subsequently used. Leaving the optimized document tree 500 as depicted in FIG. 5.

Returning to FIG. 2, the operations executed and the particular optimizations performed by the tree optimizer 218 may depend on the decoding programming language to which the decoding computing module 202 corresponds. In some embodiments, if the language in which the code segment will eventually be encoded is known (e.g., it is known that one is translating from Perl to Datapath), the set of optimization operations performed may be specific to both the decoding programming language (Perl) and the encoding programming language (Datapath). In some embodiments, the tree optimizer 218 may be configured to select a particular set of optimizations from a corpus of optimization rules, each corresponding to a particular encoding programming language. Said another way, the tree optimizer 218, knowing that the code segment will eventually be translated to Datapath, may select the Perl to Datapath optimization rules from a corpus of optimization rules that could include Perl to C++ optimization rules, Perl to C# optimization rules, Perl to optimization Java rules, and the like. Once optimized (e.g., every possible optimization operation of the tree optimizer 218 has been performed), the now-optimized document tree 212 may be transmitted to converter 220.

Converter 220 may be configured to recursively traverse the document tree 212 call a node handler for each node of the tree that corresponds to the node type. By way of example, node handler(s) 222 may include computing components (referred to as "handlers") that are configured to process arguments, blocks, compound operations, documents, expressions, variables, functions, symbols, operators, and the like. In some embodiments, the operator handlers may include a handler corresponding to each type of operator (e.g., and/or operators, arithmetic operators, arrows operator, assignment operator, etc.). Each of the node handler(s) 222 may take a node of document tree 212 and convert the node to a corresponding node of an intermediate configuration object 224. Each handler may contain specific rules for translating a particular type of document node to an intermediate configuration object. The node handler(s) 222 may be specific to the language to which decoding computing module corresponds. That is, different node handler(s) may be used when translating from the C# programming language to the intermediate configuration object 224.

Figure 6:
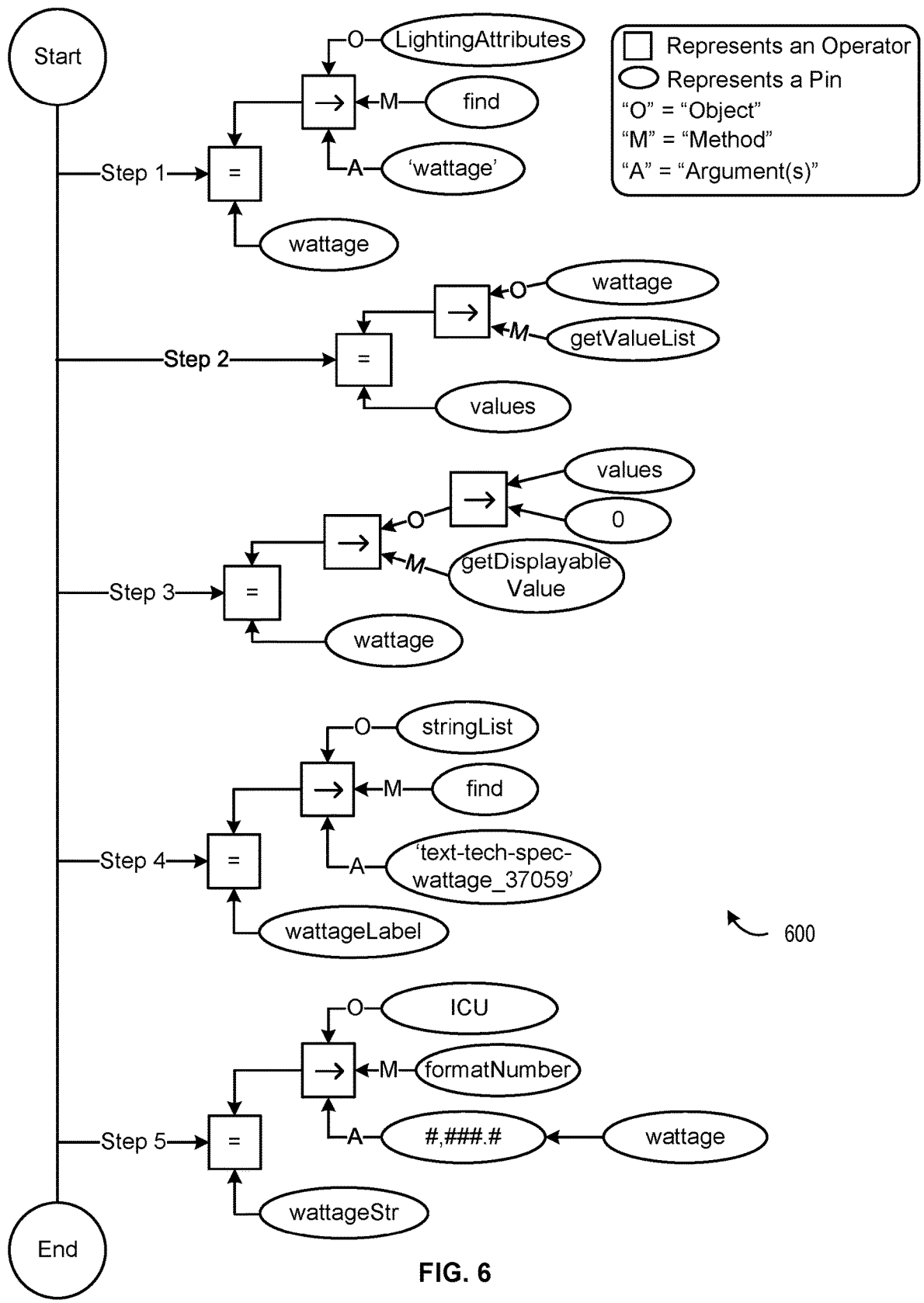
FIG. 6 is an example intermediate configuration object corresponding to the code segment of FIG. 3, in accordance with at least one embodiment.

FIG. 6 is an example intermediate configuration object 600 (e.g., an example of the intermediate configuration object 224 of FIG. 2) corresponding to the code segment of FIG. 5, in accordance with at least one embodiment. The intermediate configuration object 600 may represent a number of expressions of the code sample 300 after optimization operations have been performed. Step 1 of the intermediate configuration object 600 may correspond to the statement 502 of FIG. 5. Step 2 of the intermediate configuration object 600 may correspond to the variable 504 of FIG. 5. Step 3 of the intermediate configuration object 600 may correspond to the statement 506 of FIG. 5. Step 4 of the intermediate configuration object 600 may correspond to the variable 508 of FIG. 5. Step 5 of the intermediate configuration object 600 may correspond to the variable 510 of FIG. 5.

As depicted in FIG. 6, the intermediate configuration object 224 may be a directed acyclic graph. Each oval represents a pin (e.g., variables that hold data) and each square represents an operator (e.g., and, or, not, >, <, =<=, →, etc.).

FIG. 7 is a programmatic representation 700 of the intermediate configuration object 600 of FIG. 6, in accordance with at least one embodiment. Each node 702, 704, 706, 708, and 710 represent the code expressing steps 1-6 of FIG. 6, respectively. Each node of the intermediate configuration object 600 may be associated with four attributes: functionName, objectName, args (e.g., a list of arguments), and output, although more or fewer attributes may be utilized. The functionName defined in each node is intended to correspond to the method depicted in FIG. 6, the objectName is intended to correspond to the object depicted in FIG. 6, and the argument list is intended to correspond to the arguments depicted in FIG. 6. The output attribute is intended to correspond to the name of the output variable (e.g., wattage, values, wattageLabel, wattageStr, etc.).

Returning to FIG. 2, it should be appreciated that although the ongoing example provided in FIGS. 2-7 results in a single intermediate configuration object 224 being generated, more than one intermediate configuration object 224 may be generated from the same code sample 204. In some embodiments, the decoding computing module 202 may generate a single intermediate configuration object 224 from which various code segments may be generated corresponding to any suitable number of programming languages, in other words, a generic intermediate configuration object 224. This object may be optimized in some respect. That is, some of the operations discussed in connection with tree optimizer 218 may be performed. These operations may not be specific to any particular language. Thus, the intermediate configuration object 224 may be optimized, but not necessarily optimized for any particular language. In other embodiments, the decoding computing module 202 could generate one or more intermediate configuration objects that are optimized based at least in part on the programming language in which the code sample 204 is expressed and the language to which the code segments of that sample are to be later encoded. In some embodiments, the input to the decoding computing module 202 can indicate that the output(s) of the decoding computing module 202 will be utilized to generate code segments in one or more programming languages. If code segments for more than one programming language are to be generated, then the decoding computing module 202 may be configured to generate a corresponding intermediate configuration object for each programming language with which code segments will later be generated. If the input indicates a single programming language or no programming language at all will be used for encoding, then the decoding computing module 202 may generate a single intermediate configuration object 224.

Figure 8:
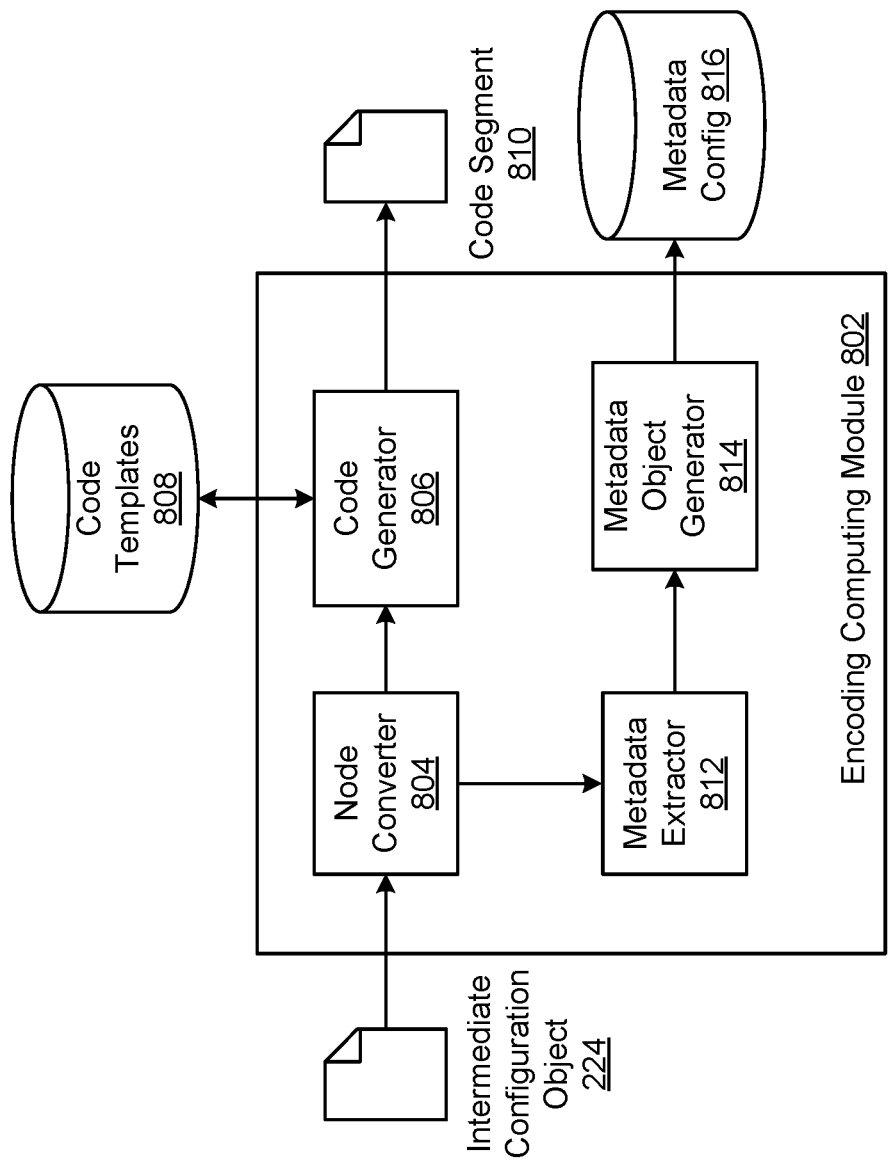
FIG. 8 is a flow illustrating example computing components of an encoding computing module that executes an encoding process to transform an intermediate configuration object to a code segment provided in a programming language different from the programming language associated with the decoding computing module of FIG. 2, in accordance with at least one embodiment.

FIG. 8 is a flow illustrating example computing components of an encoding computing module 802 that executes an encoding process to transform an intermediate configuration object (e.g., the intermediate configuration object 224 of FIG. 2, an example of the intermediate configuration object 600 of FIG. 6) to a code segment provided in a programming language different from the programming language associated with the decoding computing module of FIG. 2. The intermediate configuration object 224 may be provided as input to the encoding computing module 802 and received by the node converter 804. The node converter 804 may pass the intermediate configuration object 224 to the code generator 806. The code generator 806 may be configured to retrieve one or more code templates from code templates 808 (e.g., a data store configured to store any suitable number of code templates). The code templates 808 may include any suitable number of code templates corresponding to any suitable number of programming languages (e.g., including the programming language to which encoding computing module 802 corresponds). The one or more code templates retrieved may include the coding templates associated with the programming language to which encoding computing module 802 corresponds (e.g., Datapath). Each code templates may define a specific translation from a particular type of intermediate configuration object node to a block of code written in the programming language corresponding to the encoding computing module 802.

Using the retrieved code templates, the code generator copies the template and outputs code segment 810.

FIG. 9 is an example code segment 900 generated from the intermediate configuration object 224 of FIGS. 2 and 8, in accordance with at least one embodiment. As depicted in FIG. 9, the programming language used for encoding may be Datapath. Thus, the statements provided in code segment 900 may be Datapath defined statements. In some embodiments, the statements 902, 904, and 906 may be configured to call an application programming interface that, when executed at run time, retrieves attribute data of the object corresponding to the string obfuscatedMarketplaceId.

Returning to FIG. 8, once each node of the intermediate configuration object has been processed and a corresponding code block identified and/or modified, the code blocks may be assembled in the same order as indicated by the nodes of the intermediate configuration object to generate code segment 810. Code segment 810 may perform the same functionality as some portion of the code segment obtained by the logic extractor 206 of FIG. 2, but is written in the programming language corresponding to the encoding computing module 802 rather than the programming language associated with the decoding computing module 202.

It should be appreciated that encoding computing module 802 may be one of a set of different encoding computing modules maintained by the system (e.g., the translation system 900 discussed below). Each encoding computing module may correspond to a specific programming language. The particular programming languages represented by the set of encoding computing modules may be the same or different than the programming languages represented by the set of decoding computing modules of which decoding computing module 202 is included.

In some embodiments, the node converter 804 may also pass the intermediate configuration object 224 to the metadata extractor 812. The metadata extractor 812 may be configured to extract particular metadata values from the intermediate configuration object. The metadata config generator 814 may generate an object to store these metadata values and then passes this object to metadata data store 816 for to be stored for subsequent use.

FIG. 10 is an example metadata object 1000 generated from the intermediate configuration object 224 of FIGS. 2 and 8, in accordance with at least one embodiment. The intermediate configuration object 224 may be parsed by the metadata extractor 812 of FIG. 8 to obtain various attribute values corresponding to those presented in FIG. 10. The metadata object may be utilized to maintain a record of the attribute names of the object fields on which the operations of code segment 224 were performed.

Figure 11:
FIG. 11 illustrates an example attributeData object that corresponds to the attribute "wattage" of the code segment of FIG. 8, in accordance with at least one embodiment.

At run time, when the code segment 810 of FIG. 8 is executed, the statements 902, 904, and 906 are executed which may perform an application programming interface call that retrieves metadata object 900. The values of metadata object 900 may be used to retrieve an attributeData object that maintains various attribute data corresponding to a given attribute (e.g., wattage). FIG. 11 illustrates an example attributeData object that corresponds to the attribute "wattage" of the code segment 810 of FIG. 8, in accordance with at least one embodiment. In some embodiments, the attributeData values (e.g., "defaultLabel" and "label" may be utilized to populate the attributeName on which some of the Datapath statements of code segment 810 are to be performed.

Figure 12:
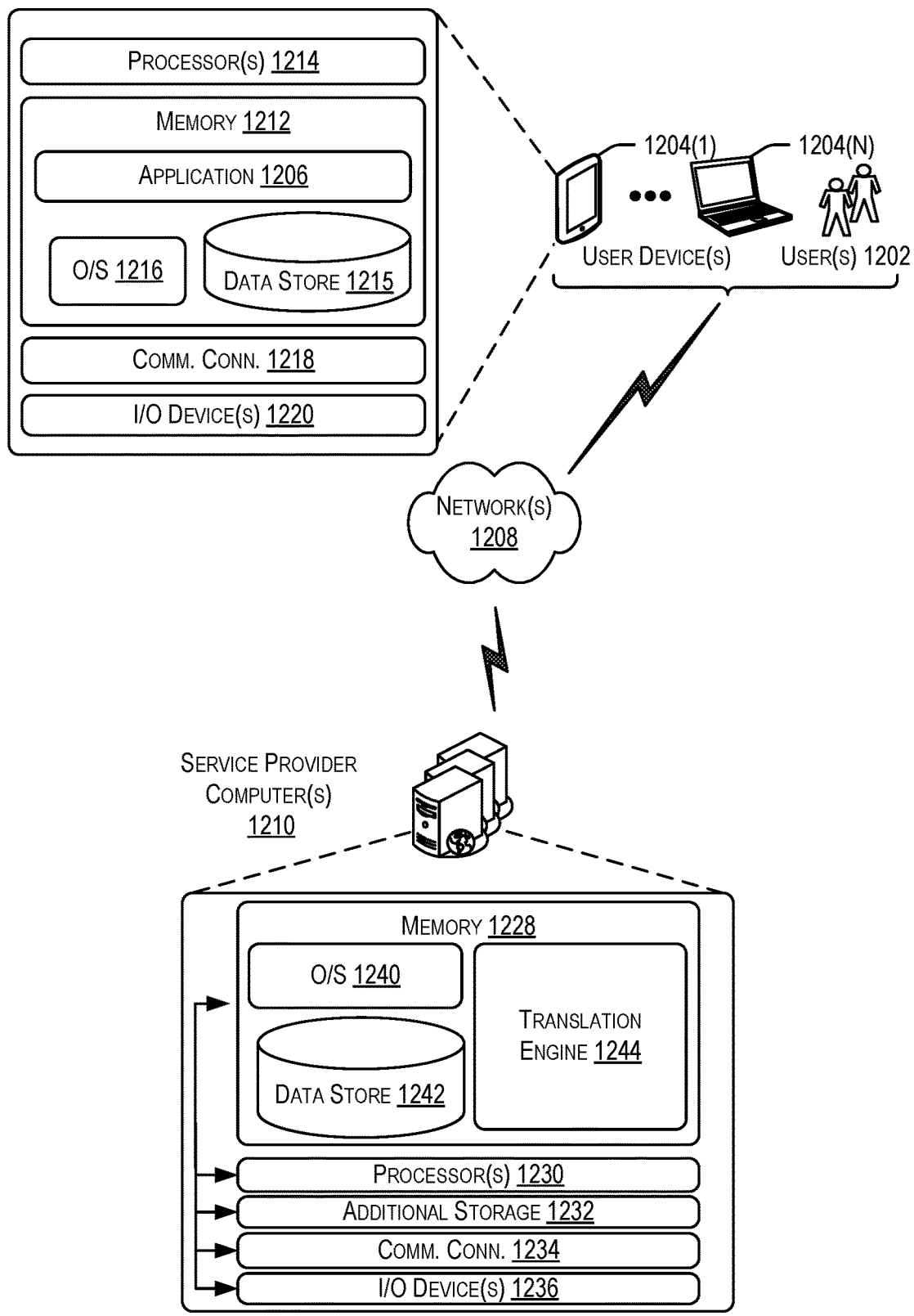
FIG. 12 illustrates components of a translation system, in accordance with at least one embodiment.

FIG. 12 illustrates components of a translation system 1200 according to a particular embodiment. In system 1200, one or more user(s) 1202 may utilize a user device (e.g., a user device of a collection of user device(s) 1204 to access a user interface accessible through an application 1206 running on the user device(s) 1204 via one or more network(s) 1208. In some aspects, the application 1206 operating on the user device(s) 1204 may be hosted, managed, and/or provided by a computing resources service or service provider, such as by utilizing one or more service provider computer(s) 1210.

In some examples, the network(s) 1208 may include any one or a combination of many different types of networks, such as cable networks, the Internet, wireless networks, cellular networks, and other private and/or public networks. While the illustrated example represents the user(s) 1202 accessing application functionality over the network(s) 1208, the described techniques may equally apply in instances where the user(s) 1202 interact with the service provider computer(s) 1210 via the one or more user device(s) 1204 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the translation engine 1244, discussed further below in more detail, may operate in whole or in part on the user device(s) 1204. Thus, in some embodiments, the user(s) 1202 may access the functionality of the translation engine 1244 directly through the user device(s) 1204 and/or the service provider computer(s) 1210 via user interfaces provided by the translation engine 1244.

The service provider computer(s) 1210, perhaps arranged in a cluster of servers or as a server farm, may host the application 1206 operating on the user device(s) 1204 and/or cloud-based software services. Other server architectures may also be used to host the application 1206 and/or cloud-based software services. The application 1206 operating on the user device(s) 1204 may be capable of handling requests from the user(s) 1202 and serving, in response, various user interfaces that can be rendered at the user device(s) 1204. The application 1206 operating on the user device(s) 1204 can present any suitable type of website that supports user interaction. The described techniques can similarly be implemented outside of the application 1206, such as with other applications running on the user device(s) 1204.

The user device(s) 1204 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 1204 may be in communication with the service provider computer(s) 1210 via the network(s) 1208, or via other network connections.

In one illustrative configuration, the user device(s) 1204 may include at least one memory 1212 and one or more processing units (or processor(s)) 1214. The processor(s) 1214 may be implemented as appropriate in hardware, computer-executable instructions, firmware, or combinations thereof. Computer-executable instruction or firmware implementations of the processor(s) 1214 may include computer-executable or machine-executable instructions written in any suitable programming language to perform the various functions described.

The memory 1212 may store program instructions that are loadable and executable on the processor(s) 1214, as well as data generated during the execution of these programs. Depending on the configuration and type of user computing device, the memory 1212 may be volatile (such as random access memory (RAM)) and/or non-volatile (such as read-only memory (ROM), flash memory, etc.). The user device(s) 1204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1212 may include multiple different types of memory, such as static random access memory (SRAM), dynamic random access memory (DRAM), or ROM.

Turning to the contents of the memory 1212 in more detail, the memory 1212 may include an operating system 1216, one or more data stores 1215, and one or more application programs, modules, or services provided via the application 1206 (e.g., a web browser application, a shopping application associated with an online retailer, etc.). The application 1206 may be configured to receive, store, and/or display a network page or other interfaces for interacting with the service provider computer(s) 1210. The application 1206 may include any suitable functionality related to code translations and/or any suitable functionality provided by the service provider computer(s) 1210. Additionally, the memory 1212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 1204 may also contain communications connection(s) 1218 that allow the user device(s) 1204 to communicate with a stored database, another computing device or server (e.g., the service provider computer(s) 1210), user terminals and/or other devices on the network(s) 1208. The user device(s) 1204 may also include I/O device(s) 1220, such as a keyboard, a mouse, a pen, a voice input device, a touch input device, a display, speakers, a printer, etc.

In some aspects, the service provider computer(s) 1210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 1210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 1210 may be in communication with the user device(s) 1204 and/or other service providers via the network(s) 1208 or via other network connections. The service provider computer(s) 1210 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 1210 may include at least one memory 1228 and one or more processing units (or processor(s)) 1230. The processor(s) 1230 may be implemented as appropriate in hardware, computer-executable instructions, firmware, or combinations thereof. Computer-executable instruction or firmware implementations of the processor(s) 1230 may include computer-executable or machine-executable instructions written in any suitable programming language to perform the various functions described.

The memory 1228 may store program instructions that are loadable and executable on the processor(s) 1230, as well as data generated during the execution of these programs. Depending on the configuration and type of service provider computer(s) 1210, the memory 1228 may be volatile (such as RAM) and/or non-volatile (such as ROM, flash memory, etc.). The service provider computer(s) 1210 or servers may also include additional storage 1232, which may include removable storage and/or non-removable storage. The additional storage 1232 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1228 may include multiple different types of memory, such as SRAM, DRAM, or ROM.

The memory 1228, the additional storage 1232, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1228 and the additional storage 1232 are all examples of computer storage media. Additional types of computer storage media that may be present in the service provider computer(s) 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 1210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 1210 may also contain communications connection(s) 634 that allow the service provider computer(s) 1210 to communicate with a stored database, another computing device or server, user terminals and/or other devices on the network(s) 1208. The service provider computer(s) 1210 may also include I/O device(s) 1236, such as a keyboard, a mouse, a pen, a voice input device, a touch input device, a display, speakers, a printer, etc.

Turning to the contents of the memory 1228 in more detail, the memory 1228 may include an operating system 1240, one or more data stores 1242, and/or one or more application programs, modules, or services for implementing the features disclosed herein, such as the features provided by the translation engine 1244. The translation engine 1244 may be configured to perform the operations discussed above in connection with FIGS. 1-8.

Figure 13:
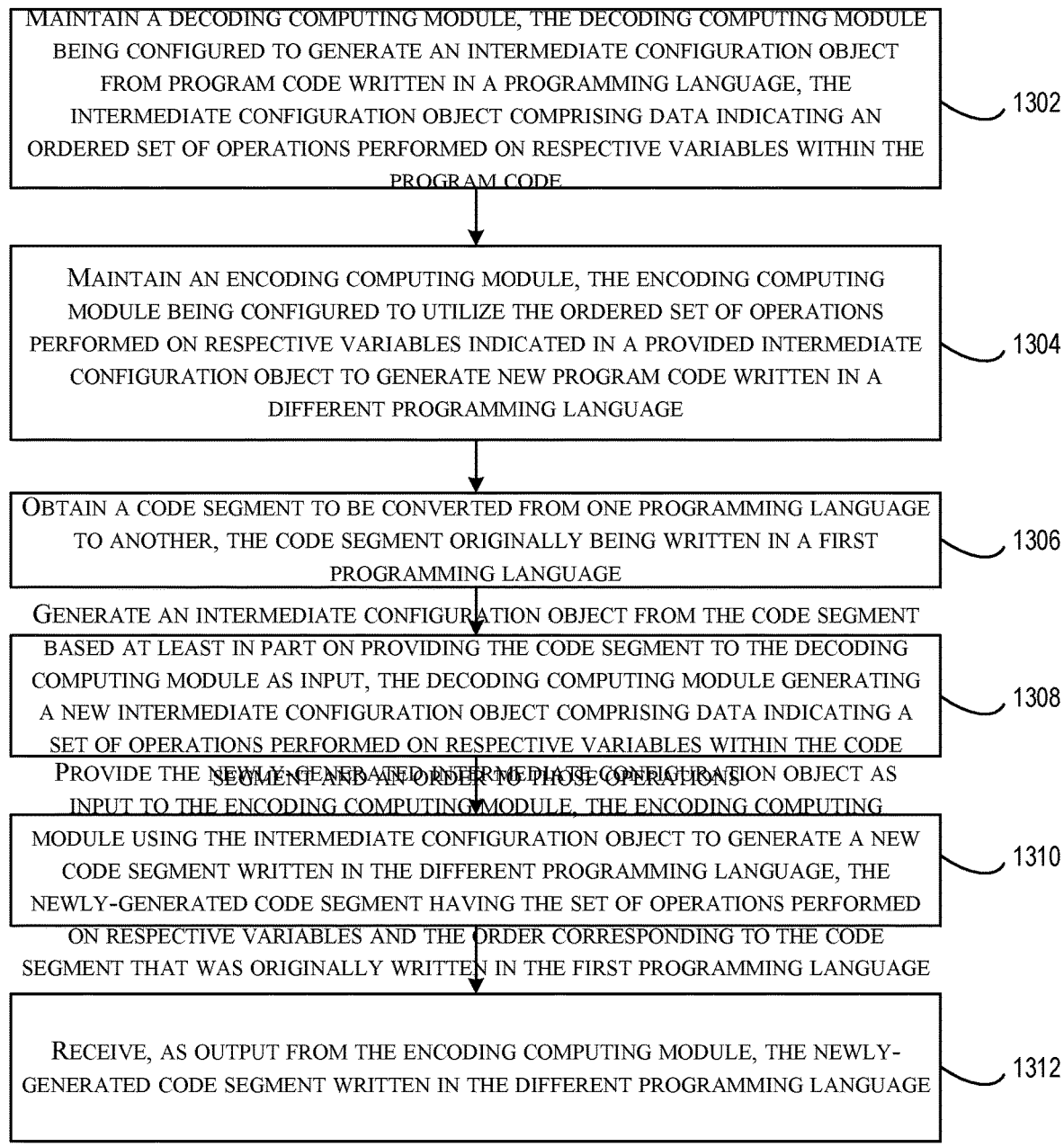
FIG. 13 is a flowchart illustrating an example method for translating a code segment from one programming language to another, in accordance with at least one embodiment.

FIG. 13 is a flowchart illustrating an example method 1300 translating a code segment from one programming language to another, in accordance with at least one embodiment. A computer-readable medium may store computer-executable instructions that, when executed by at least one processor, cause at least one computer to perform instructions comprising the operations of the method 1300. It should be appreciated that the operations of the method 1300 may be performed in any suitable, not necessarily the order depicted in FIG. 13. Further, the method 1300 may include additional, or fewer operations than those depicted in FIG. 13. The operations of method 1300 may be performed by any suitable combination of computing modules of the translation engine 1244 of FIG. 12 which may operate in whole or in part on a user device (e.g., one or more of the user device(s) 1204 of FIG. 12) and/or the service provider computer(s) 1210 of FIG. 12.

The method 1300 may begin at 1302, where a computing device (e.g., the service provider computer(s) 1210) maintains a decoding computing module to generate an intermediate configuration object from program code (e.g., code sample 204 of FIG. 2) written in a programming language (e.g., Perl). In some embodiments, the intermediate configuration object (e.g., intermediate configuration object 224 of FIGS. 2 and 8) comprises data indicating an ordered set of operations performed on respective variables within the program code. By way of example, the decoding computing module can be configured to receive (and/or identify from a larger code sample) a code segment in Perl and translate that segment to an intermediate configuration object (e.g., the intermediate configuration object of FIG. 4). As discussed above, the intermediate configuration object may be utilized to generate one or more code segments to one or mode code segments expressed in one or more different programming languages.

At 1304, the computing device maintains an encoding computing module. In some embodiments, the encoding computing module is configured to utilize the ordered set of operations performed on respective variables indicated in a provided intermediate configuration object to generate new program code written in a different programming language (e.g., Datapath).

At 1306, a code segment that is to be translated from one programming language to another may be obtained. The code segment may be written in the first programming language. This code segment may be desired in a different language (e.g., a second programming language associated with a particular encoding computing module). In some embodiments, the code segment can be identified from one or more code files based at least in part on a tag surrounding the first code segment as discussed in connection with logic extractor 206 of FIG. 2.

At 1308, a new intermediate configuration object may be generated from the code segment based at least in part on providing the code segment to the decoding computing module as input. In some embodiments, the decoding computing module may generate a new intermediate configuration object comprising data indicating a set of operations performed on respective variables within the code segment and an order to those operations.

At 1310, the newly-generated intermediate configuration object may be provided as input to the encoding computing module (e.g., the encoding computing module 802 of FIG. 8). In some embodiments, the encoding computing module uses the intermediate configuration object (e.g., the intermediate configuration object 224) to generate a new code segment (e.g., code segment 810) written in the different programming language (e.g., Datapath). In some embodiments, the newly-generated code segment includes the set of operations performed on respective variables and the order corresponding to the code segment that was originally written in the first programming language.

At 1312, the newly-generated code segment, now written/expressed in the different programming language, may be received as output from the encoding computing module. In some embodiments, the newly-generated code segment may be stored for later execution.

Figure 14:
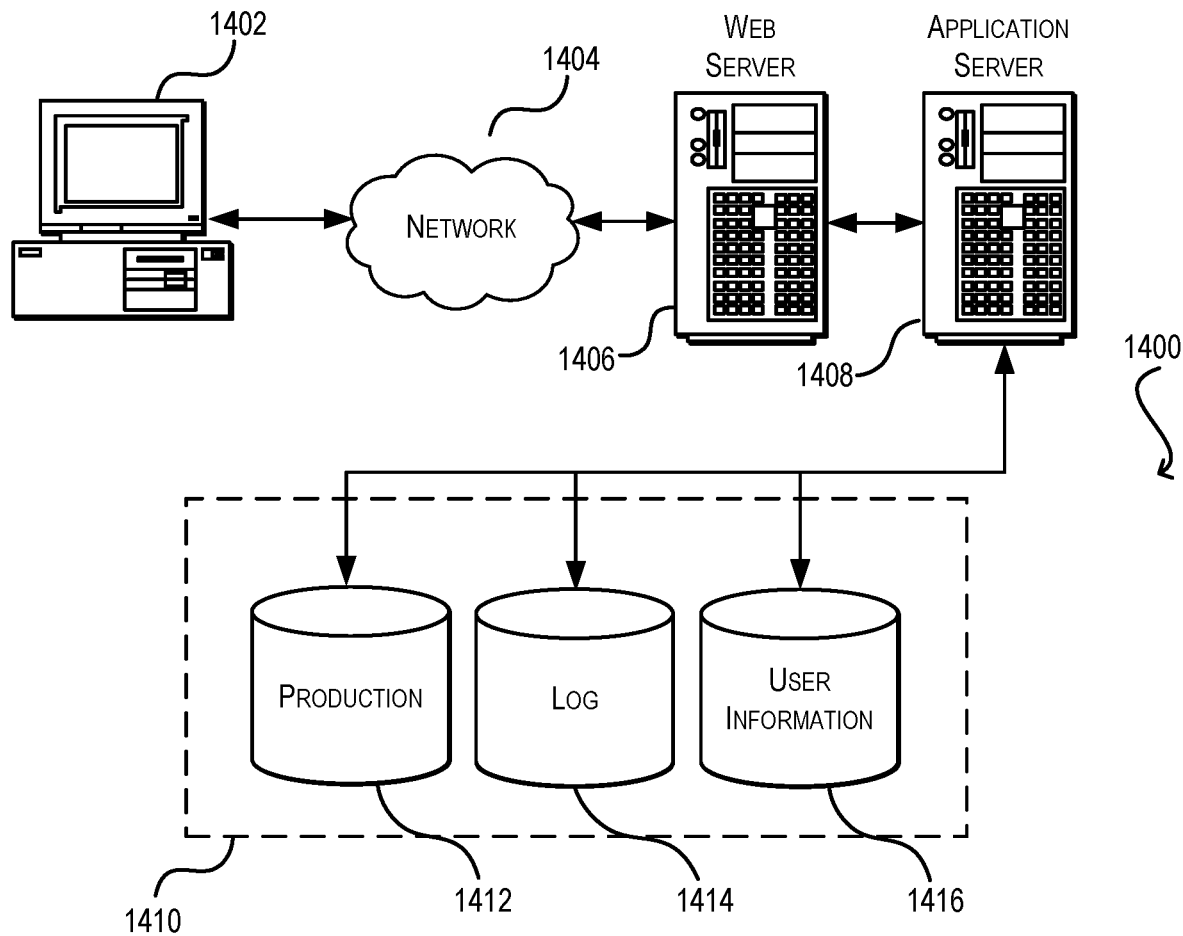
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes a user device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for translating programming code from one programming language to another, comprising:
    obtaining, by a computing device, a code segment to be converted from a first programming language to a second programming language, the code segment originally being written in the first programming language;
    generating, by the computing device, an in-memory document tree specific to the first programming language, the in-memory document tree being generated by parsing the code segment as a string, the in-memory document tree defining an ordering of each variable and operator of the code segment;
    generating, by the computing device, an intermediate configuration object from the code segment based at least in part on providing the code segment to a decoding computing module as input, the intermediate configuration object comprising data indicating a set of operations performed on respective variables within the code segment and an order to the set of operations, the intermediate configuration object being generated by recursively traversing the in-memory document tree and, for each node of the in-memory document tree, executing a node handler corresponding to a node type of a given node, the node handler being configured to convert a respective in-memory document node to a corresponding node of the intermediate configuration object;

providing, by the computing device, the intermediate configuration object as input to an encoding computing module, the encoding computing module using the intermediate configuration object to generate a new code segment written in the second programming language, the new code segment having an order of operations performed on variables corresponding to the ordering of each variable and operator of the code segment written in the first programming language; and receiving, by the computing device as output from the encoding computing module, the new code segment written in the second programming language.

2. The computer-implemented method of claim 1, wherein the decoding computing module is one of a plurality of decoding modules, each decoding module being configured to convert program code written in a corresponding programming language to a corresponding intermediate configuration object.

3. The computer-implemented method of claim 1, wherein the encoding computing module is one of a plurality of encoding modules each configured to generate program code in a corresponding programming language using a previously-defined intermediate configuration object.

4. The computer-implemented method of claim 1, wherein the intermediate configuration object is formatted as a directed acyclic graph or N-ary tree.

5. The computer-implemented method of claim 4, wherein the intermediate configuration object comprises a plurality of nodes, each node of the plurality of nodes representing a variable, a value, or an operation of the code segment.

6. A computing device, comprising:
one or more processors, and
one or more memories storing computer-executable instructions for translating program code from one programming language to another, that, when executed with the one or more processors, cause the computing device to perform operations comprising:
identifying a code segment to be translated from one programming language to another, the code segment comprising one or more logical operations and being written in a first programming language;
generating an in-memory document tree specific to the first programming language, the in-memory document tree being generated by parsing the code segment as a string, the in-memory document tree defining an ordering of each variable, statement, and operator of the code segment;
generating an intermediate configuration object from the code segment, the intermediate configuration object indicating an ordered set of operations performed on a set of variables within the code segment, the intermediate configuration object being generated by recursively traversing the in-memory document tree and, for each node of the in-memory document tree, executing a node handler corresponding to a node type of a given node, the node handler being configured to convert a respective in-memory document node to a corresponding node of the intermediate configuration object;
generating, from the intermediate configuration object, a second code segment written in a second programming language different from the first programming language, the second code segment including the ordered set of operations performed on the set of variables as expressed in the second programming language; and
storing the second code segment in memory for subsequent use.

7. The computing device of claim 6, wherein the operations performed by the computing device further comprise searching one or more program files for the code segment to be converted from one programming language to another, the code segment being associated with a label provided in code, the code segment being identified based at least in part on identifying the label within the one or more program files.

8. The computing device of claim 6, wherein the intermediate configuration object is a directed acyclic graph having a plurality of nodes, each node of the plurality of nodes corresponding to a variable of the set of variables or an operation of the ordered set of operations.

9. The computing device of claim 6, wherein the operations further comprise parsing the code segment, wherein parsing the code segment includes converting the code segment to the string, the string comprising alphanumeric values.

10. The computing device of claim 6, wherein the operations performed by the computing device further comprise:
obtaining a set of predefined code optimization rules associated with second programming language; and
modifying the in-memory document tree in accordance with the set of predefined code optimization rules associated with the second programming language.

11. The computing device of claim 6, wherein the operations performed by the computing device further comprise:
identifying a particular node of the in-memory document tree that corresponds to a complex operation; and
splitting the complex operations into multiple parts; and
generating a sub-tree of the particular node to represent one part of the complex operation.

12. The computing device of claim 6, wherein the intermediate configuration object is generated based at least in part on converting the in-memory document tree to the intermediate configuration object.

13. A non-transitory computer-readable storage medium comprising one or more memories storing computer-executable instructions for generating new program code expressed in a given programming language from program code originally written in a different programming language that, when executed with one or more processors of a computing device, cause the computing device to perform operations comprising:
obtaining a code segment expressed in a first programming language, the code segment comprising logic that includes one or more operations performed on one or more respective variables;
generating an in-memory document tree specific to the first programming language, the in-memory document tree being generated by parsing the code segment as a string, the in-memory document tree defining an ordering of each variable and operator of the code segment;
generating, from the code segment, an intermediate configuration object comprising data that indicates the one or more operations performed on the one or more respective variables and an order by which the one or more operations are to be performed, the intermediate configuration object being generated by recursively traversing the in-memory document tree and, for each node of the in-memory document tree, executing a node handler corresponding to a node type of a given node, the node handler being configured to convert a respective in-memory document node to a corresponding node of the intermediate configuration object;

generating a new code segment expressed in a second programming language that is different from the first programming language, the new code segment being generated based at least in part on the intermediate configuration object, the new code segment comprising the one or more operations and the one or more variables in the order indicated by the intermediate configuration object; and storing the new code segment in memory for subsequent use.

14. The non-transitory computer-readable storage medium of claim 13, wherein the operations further comprise:

recursively processing nodes of the intermediate configuration object to identify a respective code template corresponding to each node; and modifying each code template based at least in part on metadata associated with a particular node of the intermediate configuration object.

15. The non-transitory computer-readable storage medium of claim 13, wherein the operations further comprise converting the code segment to a string.

16. The non-transitory computer-readable storage medium of claim 15, wherein the operations further comprise maintaining a set of rules associated with identifying the one or more variables and the one or more operations from the code segment expressed in the first programming language, wherein the one or more variables and the one or more operations are identified using the string and the set of rules.

17. The non-transitory computer-readable storage medium of claim 13, wherein the operations further comprise at least one of: 1) generating at least one other code segment written in a programming language different from the first programming language and the second programming language, or 2) presenting data related to the code segment expressed in the first programming language, the new code segment expressed in the second programming language, or the intermediate configuration object.

18. The non-transitory computer-readable storage medium of claim 13, wherein the operations further comprise generating, from the code segment, an additional intermediate configuration object that indicates the one or more operations performed on the one or more respective variables and respective order by which the one or more operations are performed in the code segment, the intermediate configuration object corresponding to the second programming language and the additional intermediate configuration object corresponding to a third programming language.

19. The non-transitory computer-readable storage medium of claim 18, wherein the operations further comprise generating another code segment expressed in the third programming language based at least in part on the additional intermediate configuration object generated from the code segment.

* * * * *